(12) United States Patent
Endo et al.

(10) Patent No.: US 6,650,193 B2
(45) Date of Patent: Nov. 18, 2003

(54) OSCILLATOR WITH A NOISE REDUCTION FUNCTION, A WRITER, AND A METHOD OF CONTROLLING A WRITER

(75) Inventors: Takashi Endo, Suwa (JP); Yoichi Fujii, Suwa (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 10/117,687

(22) Filed: Apr. 5, 2002

(65) Prior Publication Data

US 2002/0158694 A1 Oct. 31, 2002

(30) Foreign Application Priority Data

Apr. 6, 2001 (JP) .......................................... 2001-108967

(51) Int. Cl.[7] .............................. H03B 29/00; H03L 7/06; H03L 7/18
(52) U.S. Cl. .............................. 331/78; 331/16; 331/17; 331/18; 331/23
(58) Field of Search ............................. 331/16–18, 23, 331/25, 78; 327/156–159, 164

(56) References Cited

U.S. PATENT DOCUMENTS 5,742,208 A * 4/1998 Blazo .......................... 331/23

FOREIGN PATENT DOCUMENTS

JP 09/98152 8/1997

* cited by examiner

Primary Examiner—David C. Mis
(74) Attorney, Agent, or Firm—Harness, Dickey & Pierce, P.L.C.

(57) ABSTRACT

An oscillator 10 with a noise reduction function has a memory 80 that memorizes modulation data DM for performing the spread spectrum modulation input from an output terminal fout, a modulation signal output circuit 60 that generates a modulation signal SM from the modulation data DM memorized in the memory 80, and a mixer 53 that overlays the modulation signal SM on the control voltage VC of a voltage control oscillator (VCO) 54 of a PLL circuit 50, and it becomes possible to output a spread spectrum modulated output signal CLv under a specification desired by a user by memorizing in the memory 80 the modulation data DM that corresponds to the spread spectrum modulation the user tries to set.

12 Claims, 9 Drawing Sheets

OSCILLATOR WITH A NOISE REDUCTION FUNCTION, A WRITER, AND A METHOD OF CONTROLLING A WRITER

BACKGROUND OF THE INVENTION

1. Field of Technology to Which the Invention Belongs

The present invention relates to an oscillator with a noise reduction function that reduces the EMI noise of electronic equipment containing an oscillator, a writing device and a control method of a writing device that can change the oscillator setting.

2. Prior Art Technology

In recent years, security measures for electronic equipment such as personal computers and facsimiles are becoming important. In the current situation, products that do not meet the EMI (Electromagnetic Interference) standard cannot be sold in certain locations. The EMI noise is generated by high frequency wave components contained in digital signals radiating from transmission lines. Therefore, in order to reduce the EMI noise, it is important to reduce the high frequency wave components and the loop current.

On the other hand, in modern electronic equipment, due to the demand for high performance and high throughput, the basic operation frequencies of microprocessors exceed 50 MHz and continue to increase even now. However, the EMI noise often increases along with the speed increase of the electronic equipment. Conventionally, when a signal based on the clock signal (various kinds of clock signals and signals on the data bus and clock bus) is a cause of the EMI noise, a method is adopted that eliminates the high frequency wave component of the clock signal etc. with a filter. Also, techniques other than filters for cutting the EMI include shielding in the case shield and the ground plane.

However, because the method of installing a filter requires a space for the filter on the circuit board, there has been a disadvantage for the miniaturization of electronic equipment. Especially in 32-bit microprocessors, because the data bus and address bus occupy a majority of wiring, it is spatially difficult to install filters to the wiring. Also, because there are cases where an EMI test must be passed with an open box due to changes in the EMI standard, there occurs a situation where a method of using a case shield can not be applied. Furthermore, there has been a problem of increased manufacturing costs in the methods of shielding by the case shield and ground plane.

Figure 10:
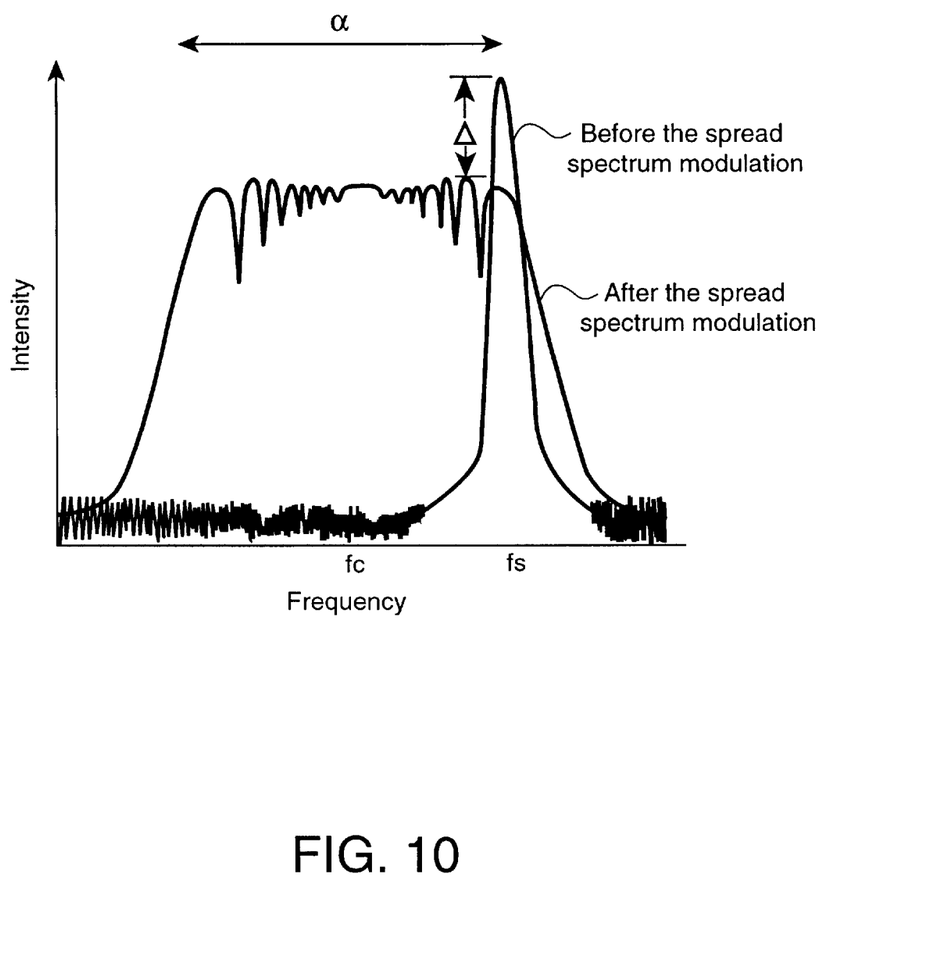
FIG. 10 is a plot for explaining the spread spectrum modulation.

Given such a situation, as shown in FIG. 10, recent oscillators have included a spread spectrum function designed to lower the peak energy of the frequency reference and to reduce EMI noise by spreading the frequency range of the clock signal. By this means, the peak energy of the EMI noise issued from the clock signal and signals derived from the clock signal are lowered, making it possible to meet the EMI standard which regulates the EMI standard value (radiation limit value) at the peak value.

However, because oscillators having this kind of spread spectrum function have their own spread range, spread direction, etc. which is respectively fixed, if the electronic equipment in which an oscillator is embedded does not meet the EMI standard value, the whole oscillator needed to be replaced. In this instance, the spread range refers to the frequency range width of the clock signal treated with spread spectrum modulation (indicated by a code α in FIG. 10), which include a center spread which permits a spread so that the specification frequency of the oscillator fs becomes the center frequency fc, and a down spread which permits spread so that the frequency based on the specification becomes the maximum frequency. FIG. 10 shows the case of down spread.

Also, for users who embed an oscillator in the electronic equipment, techniques for setting the spread range and spread direction to meet the EMI standard needs to be examined beforehand, and in order to do so, oscillators of different spread ranges etc. need to be manufactured every time or prepared beforehand, which has been a problem.

The present invention has the objective of providing an oscillator with a noise reduction function that can reduce the noise of electronic equipment by arbitrarily changing the spread of the spectrum modulation setting, a writing device that can change the setting of this oscillator, and a control method for the writing device.

SUMMARY OF THE INVENTION

In order to solve the problem, the present invention is characterized by, in an oscillator with a noise reduction function, being equipped with an oscillation means that outputs the first reference signal, a memory means where modulation data for performing the spread spectrum modulation are selectively memorized, a write control means that performs writing of the modulation data to the memory means, and rewriting and erasing the modulation data memorized in the memory means according to externally input data, a modulation signal output means that generates modulation signals from the modulation data and outputs them, and a reference signal output means that outputs the second reference signal at a frequency which is a multiple of the frequency of the first reference signal when the modulation signal is not input, or on the other hand outputs the third reference signal wherein the second reference signal is spread spectrum modulated based on the modulation signal when the modulation signal is input.

By means of the present invention, because an oscillator with a noise reduction function generates modulation signals from modulation data memorized in the memory means by the modulation signal output means and outputs a third reference signal spread spectrum modulated based on the modulation signal by the reference signal output means, if the modulation data memorized in the memory means are rewritten, the setting of the spread spectrum modulation can be changed, and if the modulation data are not memorized in the memory means, a second reference signal without spread spectrum modulation can be output.

Also, as a writing device that writes data to the memory means of the oscillation means with a noise reduction function, the present invention is characterized by the fact that it is equipped with a connection means that connects each terminal of the oscillator with a noise reduction function, an input means that inputs the setting information that is to be set to the oscillator with a noise reduction function, a modulation data generation means that, according to the specification of the spread spectrum modulation contained in the setting information, generates corresponding modulation data, a transfer means that transfers the modulation data to the oscillator with a noise reduction function, and a control means that instructs writing of the transferred modulation data to the oscillator with a noise reduction function.

By means of the present invention, according to the input specification of the spread spectrum modulation that is to be applied to the oscillator with a noise reduction function, the writing device can make the modulation data generation means generate corresponding modulation data, and the transfer means writes the data to the memory means of the oscillator with a noise reduction function. Therefore, it becomes possible to arbitrarily set the specification of spread spectrum modulation of the oscillator with a noise reduction function to a specification desired by the user.

Also, in a control method of a writing device that writes data to the memory means of the oscillator with a noise reduction function, the present invention is characterized by having an input procedure that inputs the setting information to be set to the oscillator with a noise reduction function, a modulation data generation procedure that, according to specification of the spread spectrum modulation contained in the setting information, generates the corresponding modulation data, a transfer procedure that transfers the modulation data to the oscillator with a noise reduction function, and an instruction procedure that instructs writing of the transferred modulation data to the oscillator with a noise reduction function.

DETAILED DESCRIPTION

An embodiment of the present invention is described hereafter, with reference to the drawings where appropriate.

(1) An Embodiment (1-1) Configuration of the Embodiment

Figure 1:
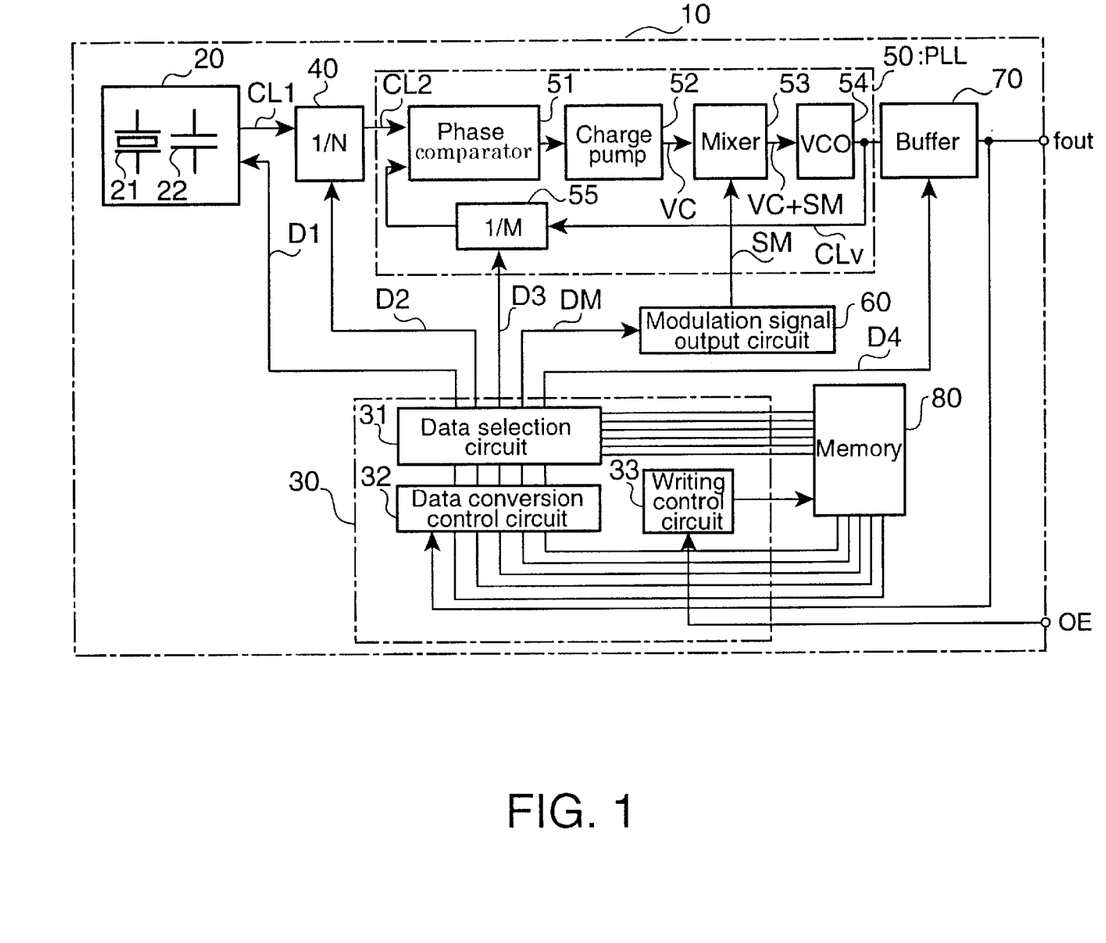
FIG. 1 is a block diagram of a programmable oscillator related to an embodiment of the present invention.

FIG. 1 is a block diagram of a programmable oscillator related to an embodiment of the present invention.

In this programmable oscillator (oscillator with a noise reduction function) 10, an oscillation circuit 20 is an oscillation circuit that oscillates a resonator 21 such as a quartz crystal resonator. The oscillation circuit 20 has a variable capacity circuit 22 so that the variable capacity circuit 22 sets the composite capacity value of the oscillation circuit 20 according to the setting data D1 input from a controller 30. Specifically, as the variable capacity circuit 22, a circuit that controls connection/disconnection of a capacitor array for variable capacity or a circuit that controls the voltage of a variable capacity diode (varicap) are applied.

A variable dividing circuit (another dividing means) 40 divides a reference signal CL1 (frequency f1) output from the oscillation circuit 20 by 1/N and outputs a divided signal (the first reference signal) CL2 (frequency fs=f1/N). The variable dividing circuit 40 is designed so that the dividing ratio N is set according to the setting data D2 input from a controller 30.

A PLL circuit (reference signal output means) 50 consists of a phase comparator 51, a charge pump 52, a mixer (mixing means) 53, a voltage controlled oscillator (VCO) 54, and a variable dividing circuit (dividing means) 55, and functions as both a frequency multiplying circuit and a modulation circuit that performs spread spectrum modulation. Namely, in this PLL circuit 50, the output signal CLv (frequency fv) of the voltage controlled oscillator 54 is divided by 1/M by the variable dividing circuit 55 and is afterwards fed back to the phase comparator 51. Then, in the phase comparator 51, the phase difference between the divided output signal CLv' (frequency fv/M) of the voltage controlled oscillator 54 and the divided signal CL2 output from the variable dividing circuit 40 is detected, and a signal proportional to the phase difference is output. The output signal of the phase comparator 51 is designed so that, after it is converted into a control voltage (VC for controlling the voltage controlled oscillator 54, it is overlapped with a modulation signal SM output from a modulation signal output circuit 60 by the mixer 53 and is supplied to the voltage controlled oscillator 54. In this instance, the "control voltage output means" in the Scope of Patent Claims is configured to the phase comparator 51 and the charge pump 52.

Therefore, the PLL circuit 50 accomplishes control by the control voltage VC of the voltage controlled oscillator 54 so that the divided output signal CLv' (frequency fv/M) of the voltage controlled oscillator 54 has the same phase and the same frequency with the divided signal CL2 (frequency fs), and functions as a frequency multiplying circuit that outputs a signal (the second reference signal) which is M times the frequency fs of the input divided signal CL2. Furthermore, the PLL circuit 50, by overlapping the modulation signal SM to the control voltage VC and supplying it to the voltage controlled oscillator 54, performs frequency modulation (spread spectrum modulation) so that the output signal (the third reference signal) CLv of the voltage controlled oscillator 54 is spread to a predefined frequency band (see FIG. 10). Then, the output signal CLv of the PLL circuit 50 is designed to be output to the outside from an output terminal fout via a buffer 70.

Also, the PLL circuit 50 is designed to set the dividing ratio M of the variable dividing circuit 55 according to the setting data D3 input from the controller 30, namely the multiplication rate M of the PLL circuit 50. Furthermore, the buffer 70 is designed to set the specification (output level and duty) of the output driver according to the setting data D4 input from the controller 30 for CMOS and TTL.

Figure 2:
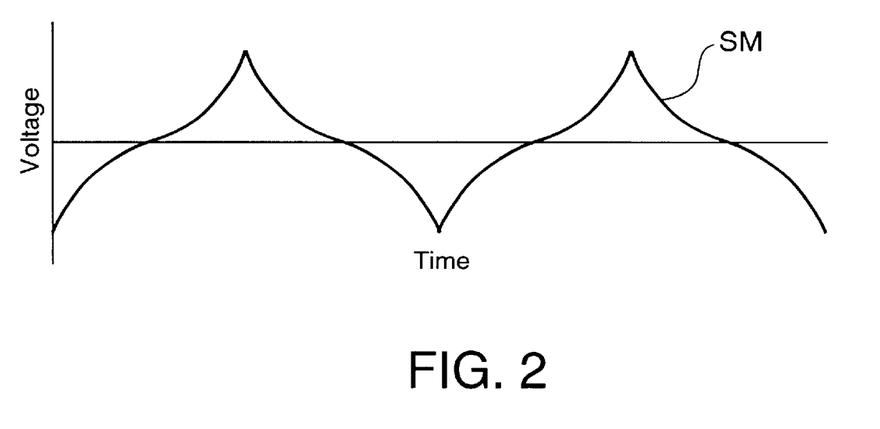
FIG. 2 is a plot showing a signal waveform of the modulation signal.
Figure 3:
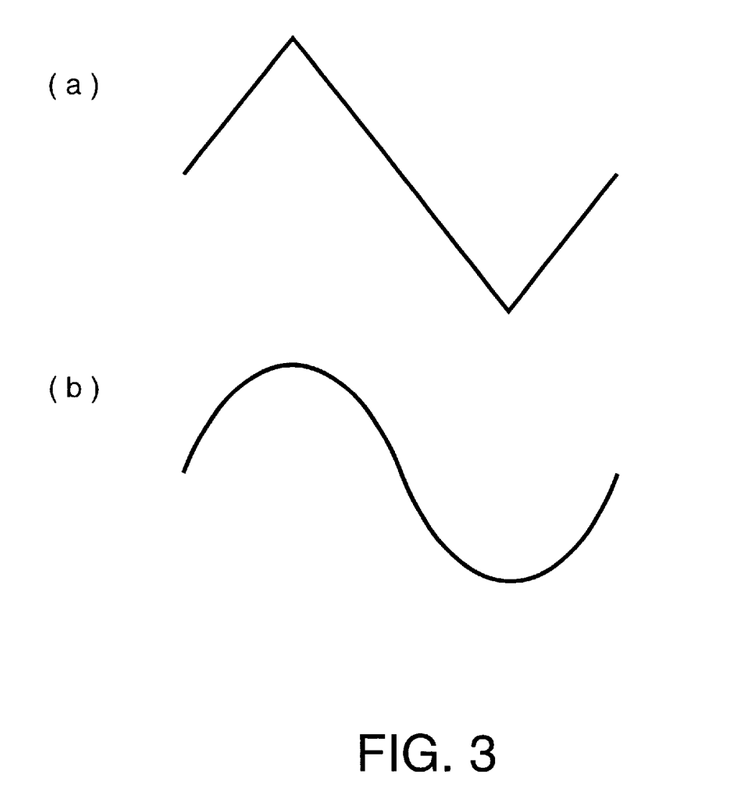
FIG. 3 are illustrations for explaining spread profiles.

The modulation signal output circuit (modulation signal output means) 60 is a circuit that generates the modulation signal SM for performing spread spectrum modulation from the modulation data DM input from the controller 30, and supplies it to the mixer 53 of the PLL circuit 50. FIG. 2 is a drawing showing a signal waveform of the modulation signal SM. This waveform of the modulation signal SM is called a spread profile which expresses a varying form of the frequency time region in the output signal CLv of the PLL circuit 50 which is spread spectrum modulated. Within this spread profile, are the triangular wave shown in FIG. 3(a), and a sine wave shown in FIG. 3(b), etc. Changing the spread profile is made possible by changing the modulation data. The spread profile shown in FIG. 2 is a case of waveform that is believed to perform the most effective EMI reduction performance.

Also, the peak-to-peak of the modulation signal SM corresponds to the spread range (indicated by code a in FIG. 10) of the frequency in the output signal CLv of the PLL circuit 50 which is spread spectrum modulated. Usually, this is set to be ±0.5 [%] or ±1 [%] of the center frequency fc (see FIG. 10) of the output signal CLv. As an example, in a 100 [MHz] signal modulated by ±0.5 [%], it is designed so that the frequency of the output signal CLv is spread between 99.5 [MHz] and 100.5 [MHz]. Namely, the modulation data DM are the data which are set if the spread profile and the spread range are determined.

The memory (memory means) 80 is a PROM (Programmable Read Only Memory) wherein the setting data D1 (capacity adjustment value) of the oscillation circuit 20, the setting data D2 (dividing ratio N) of the variable dividing circuit 40, the setting data D3 (dividing ratio M) of the PLL circuit 50, the setting data D4 (specification of the output driver) of the buffer 70, modulation data DM, etc. are selectively memorized.

The controller (write control means) 30 consists of a data selection circuit 31, a data conversion control circuit 32, and a writing control circuit 33. In the controller 30, the data selection circuit 31 is a circuit that selects whether the data memorized in the memory 80 or the data retained in the data conversion control circuit 32 should be the setting data D1~D4 and modulation data DM to be transmitted to the oscillation circuit 20, the variable dividing circuit 40, the PLL circuit 50, the modulation signal output circuit 60, and the buffer 70. The data selection circuit 31 is set so that the data memorized in the memory 80 are usually transmitted to each circuit as the setting data D1~D4 and modulation data DM, and it selects the data retained in the data conversion control circuit 32 to be transmitted to each circuit when an instruction to switch is externally input via the output terminal fout.

The data conversion control circuit 32 is a circuit that performs a serial-parallel conversion of the setting data D1~D4 and modulation data DM externally input via the output terminal fout and retains them, and outputs them to the corresponding area of the data selection circuit 31 and the memory 80, respectively. Also, the writing control circuit 33 is a circuit that, based on a writing instruction input via the control terminal OE, performs a writing control of the setting data D1~D4 and modulation data DM input from the data conversion control circuit 32 to the memory 80. Namely, the programmable oscillator 10 is designed to enable writing and erasing of the setting data D1~D4 and modulation data DM memorized in the memory 80 based on the externally input data.

Figure 4:
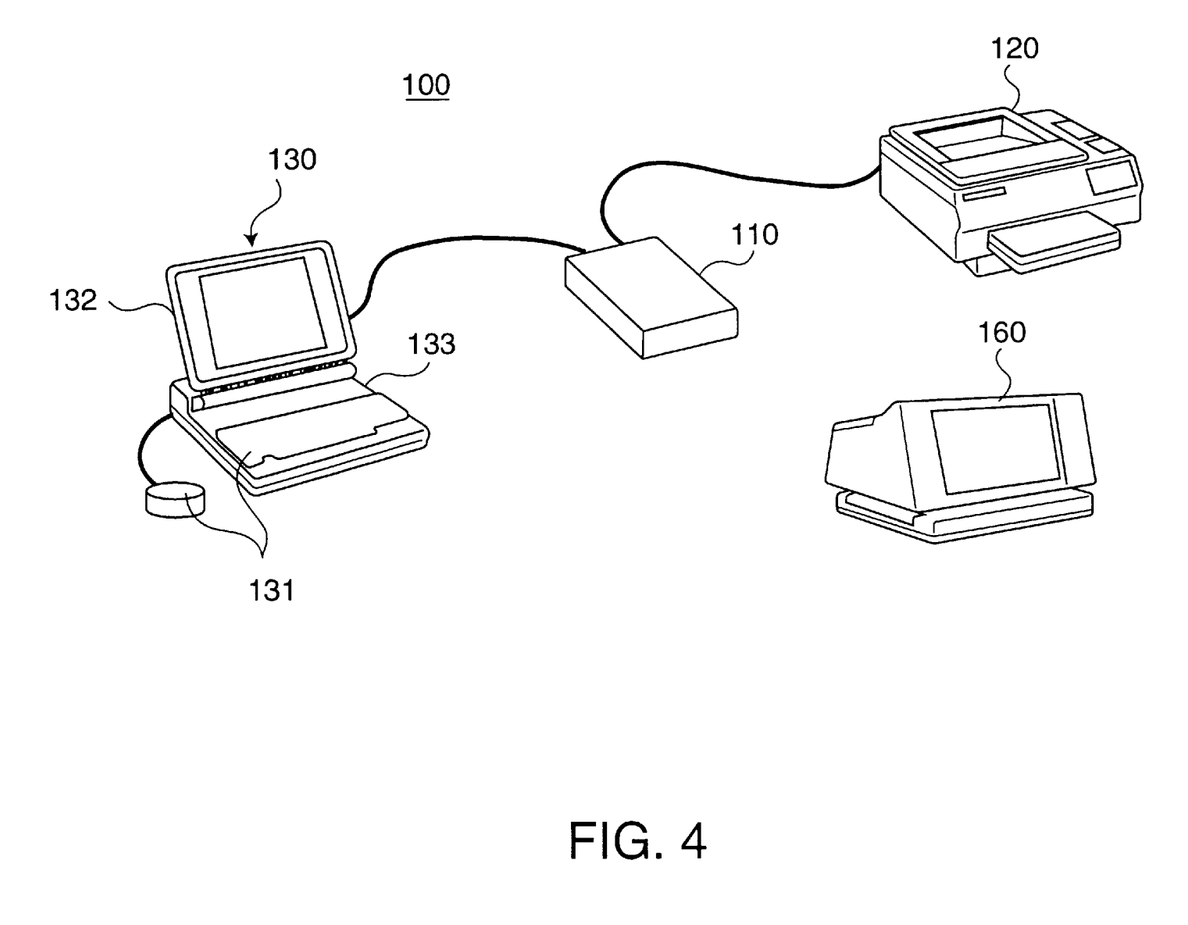
FIG. 4 is an illustration showing the configuration of a writing device that sets the programmable oscillator.

FIG. 4 is an illustration showing the configuration of a writing device 100 that sets the programmable oscillator 10. In the figure, 110 is a connection unit (connection means), which is connected with electronic equipment (an actual product such as a printer and portable telephone) 120 containing the programmable oscillator 10 so that it is electrically connected to each terminal of the programmable oscillator 10. The connection unit 110 performs driving control of the programmable oscillator 10 inside the electronic equipment 120 and the whole electronic equipment 120, and writes data to and reads data from the memory 80 of the programmable oscillator 10, under the control of a personal computer (called "PC" below) 130.

Also, the PC 130 consists of an input device 131 such as a keyboard and a mouse for inputting various kinds of information from a user, a display 132 such as a CRT and an LCD, and a main body 133 equipped with a CPU, ROM, RAM, an HDD, a communication interface, etc. with which the connection unit 110, etc. are connected. The PC 130 is designed to be able to set the programmable oscillator 10 inside the electronic equipment 120 connected with the connection unit 110 following the operation of the operator of the PC 130 by the CPU reading an application program for setting stored in the HDD and executing it. Also, 160 is an EMI measurement device that measures the EMI noise radiating from the electronic equipment 120 connected to the connection unit 110.

Figure 5:
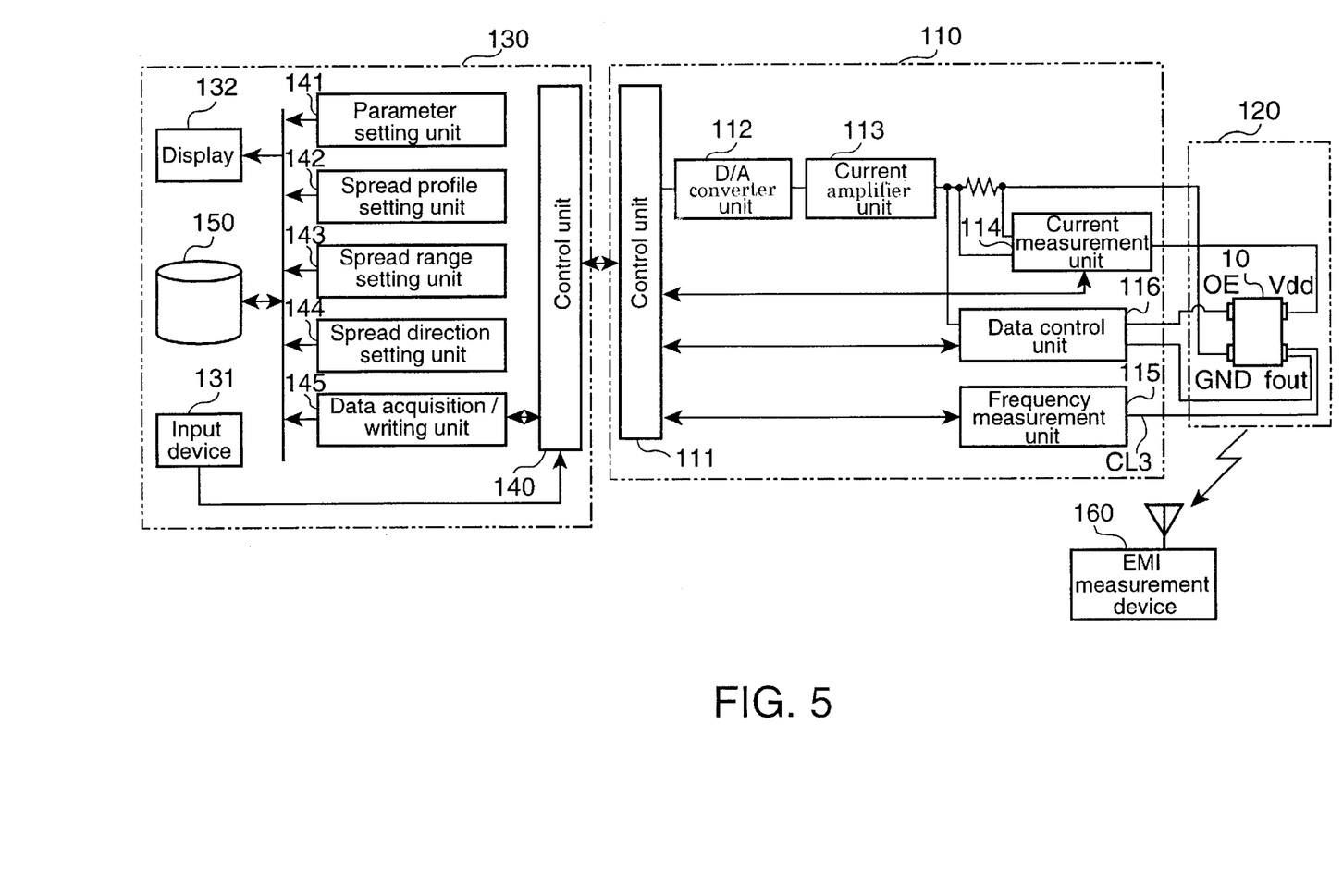
FIG. 5 is a block diagram functionally showing the configuration of the writing device.

FIG. 5 is a block diagram functionally showing the configuration of the writing device 100.

As shown in the figure, in the connection unit 110, a control unit 111 is connected via a D/A converter unit (driving means) 112 and a current amplifier unit (driving means) 113 with power terminals VDD and GND of the programmable oscillator 10 inside the electronic equipment 120. It is designed so that, by the control unit 111 supplying digital signals to the D/A converter unit 112, driving power can be supplied between the power terminals VDD and GND of the programmable oscillator 10 to drive it.

Also, the control unit 111 is also designed to be able to drive the electronic equipment 120 when measuring the EMI noise of the electronic equipment 120 with an EMI measurement device 160. Also, the control unit 111 is designed to measure the driving current with a current measurement unit (consumed power measurement means) 114, measure by a frequency measurement unit (frequency measurement means) 115 the frequency of the reference signal CL3 output from the output terminal fout of the programmable oscillator 10, and output the measurement results to the PC 130.

Also, when data to be written to the memory 80 of the programmable oscillator 10 are input from the PC 130, the control unit 111 can have them transferred to the programmable oscillator 10 via the output terminal fout of the programmable oscillator 10 and written to the memory 80 of the programmable oscillator 10 by a data control unit 116. On the other hand, when a data read instruction is input from the PC 130, the control unit 111 can read data from the memory 80 of the programmable oscillator 10 via a control terminal OE of the programmable oscillator 10 and output the read data to the PC 130 by the data control unit (transfer means) 116.

In these cases, the data control unit 116 is designed to input the reference signal CL3 output from the output terminal fout of the programmable oscillator 10 and synchronize communication with the programmable oscillator 10 based on the reference signal CL3. Here, the data control unit 116 also has a function of monitoring the voltage and waveform charged to the control terminal OE when data are written so as to prevent loss or destruction of data inside the memory 80 of the programmable oscillator 10.

The PC 130 is designed to function as a control unit 140, a parameter setting unit 141, a spread profile setting unit 142, a spread range setting unit 143, a spread direction setting unit 144, and a data acquisition/writing unit 145 by the CPU reading the application programs for setting stored in the HDD 150 and executing them.

The control unit (a modulation data generation means, a setting data generation means, and a control means) 140, by controlling the whole PC 130 based on user's operation input via the input device 131, displays on the display 132 the input screen of the setting information and various kinds of information to be set to the programmable oscillator 10, and transfers various kinds of data to the programmable oscillator 10 via the control by the connection unit 110.

The parameter setting unit (a setting data generation means) 141 sets the setting data D1~D4 for determining the oscillation frequency (the frequency of the output signal CLv) of the programmable oscillator 10 under the control of the control unit 140, and sets the EMI standard value used for judging the EMI noise of the electronic equipment 120. Here, the information on the EMI standard of each country is stored in the HDD 150. The parameter setting unit 141 is designed to search the EMI standard value with the country where it is used, the kind of electronic equipment, the title of the EMI standard, etc. as the search key. For example, it is designed so that, if Japan is set as the search key, the standard values of VCCI (Voluntary Control Council for Interference by Information Technology Equipment) can be searched, and if the United States of America is set as the search key, the standard values of FCC (Federal Communications Commission) can be searched.

A spread profile setting unit (modulation data generation means) 142 sets the spread profile ("triangular wave", "cosine wave", etc.) of the programmable oscillator 10 under the control of the control unit 140, and a spread range setting unit (modulation data generation means) 143 sets the spread range (±0.5%, ±1%, etc.) of the oscillation frequency of the programmable oscillator 10. Specifically, for example, for spread profile input by a user, the spread profile setting unit 142 selects and sets a spread profile that corresponds to one stored in the HDD 150. Then, in the spread range setting unit 143, for the spread range input together by the user, a voltage value necessary for obtaining the target maximum frequency shift, which is the voltage value shown on the vertical axis of the plot in FIG. 2 here, is set. In this way, the modulation data DM consist of the two data of the spread profile and the spread range set by them.

Figure 6:
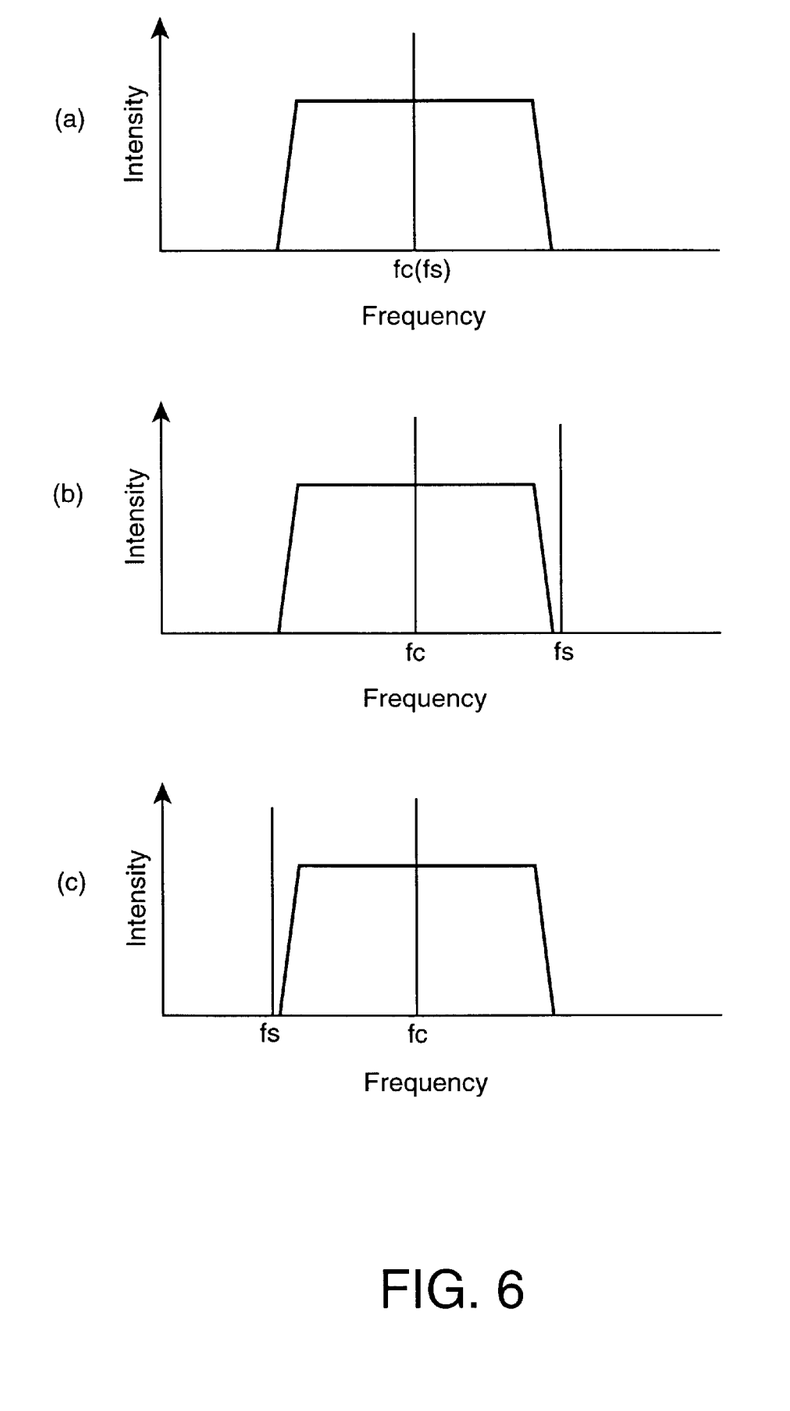
FIG. 6 are plots for explaining the spread direction.

Also, the spread direction setting unit (modulation data generation means) 144 performs setting on whether to spread so that the specification frequency fs becomes the central frequency fc under the control of the control unit 140 (center spread), to spread so that the specification frequency fs becomes close to the maximum frequency (down spread), or to spread so that the specification frequency fs becomes close to the minimum frequency (up spread). Here, FIG. 6(a) shows the frequency-signal strength property in the case of the center spread, FIG. 6(b) shows the frequency-signal strength property in the case of the down spread, and FIG. 6(c) shows the frequency-signal strength property in the case of the up spread.

The data acquisition/writing unit (transfer means) 145, under the control of the control unit 140, acquires the setting data D1~D4 set by the setting units 141~144 and the modulation data DM and notifies the control unit 140, and has the data read from the memory 80 of the programmable oscillator 10, the measured oscillation frequency of the programmable oscillator 10, and the input EMI measured noise value of the electronic equipment 120 memorized by the HDD 150.

(1-2) Operation of the Embodiment

Figure 7:
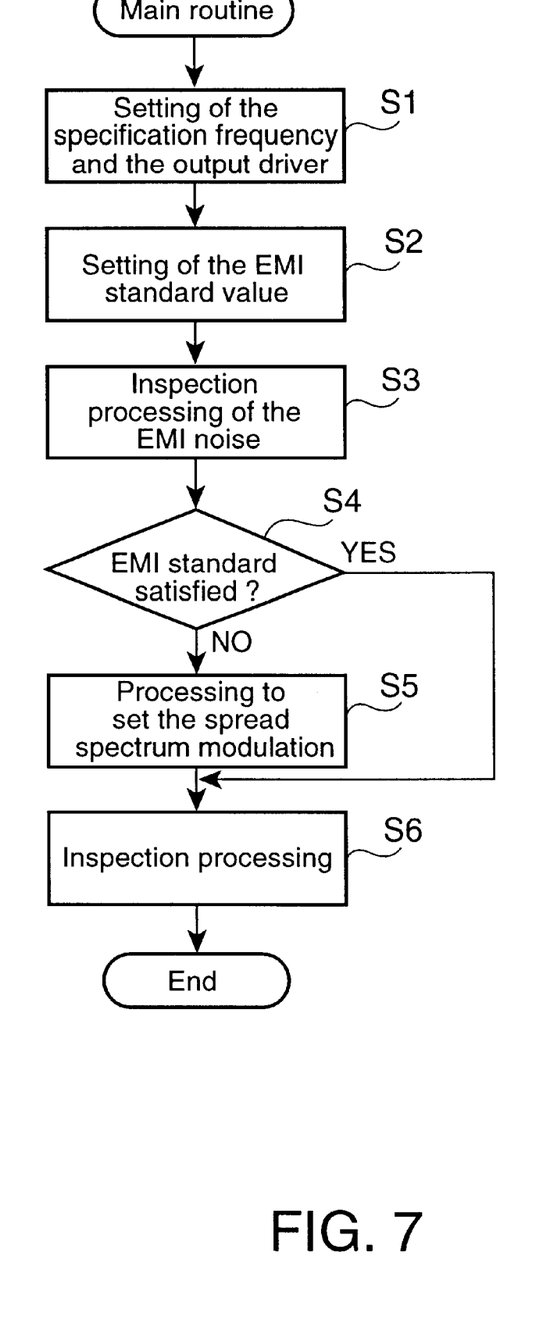
FIG. 7 is a flow chart showing the main routine of the PC.
Figure 8:
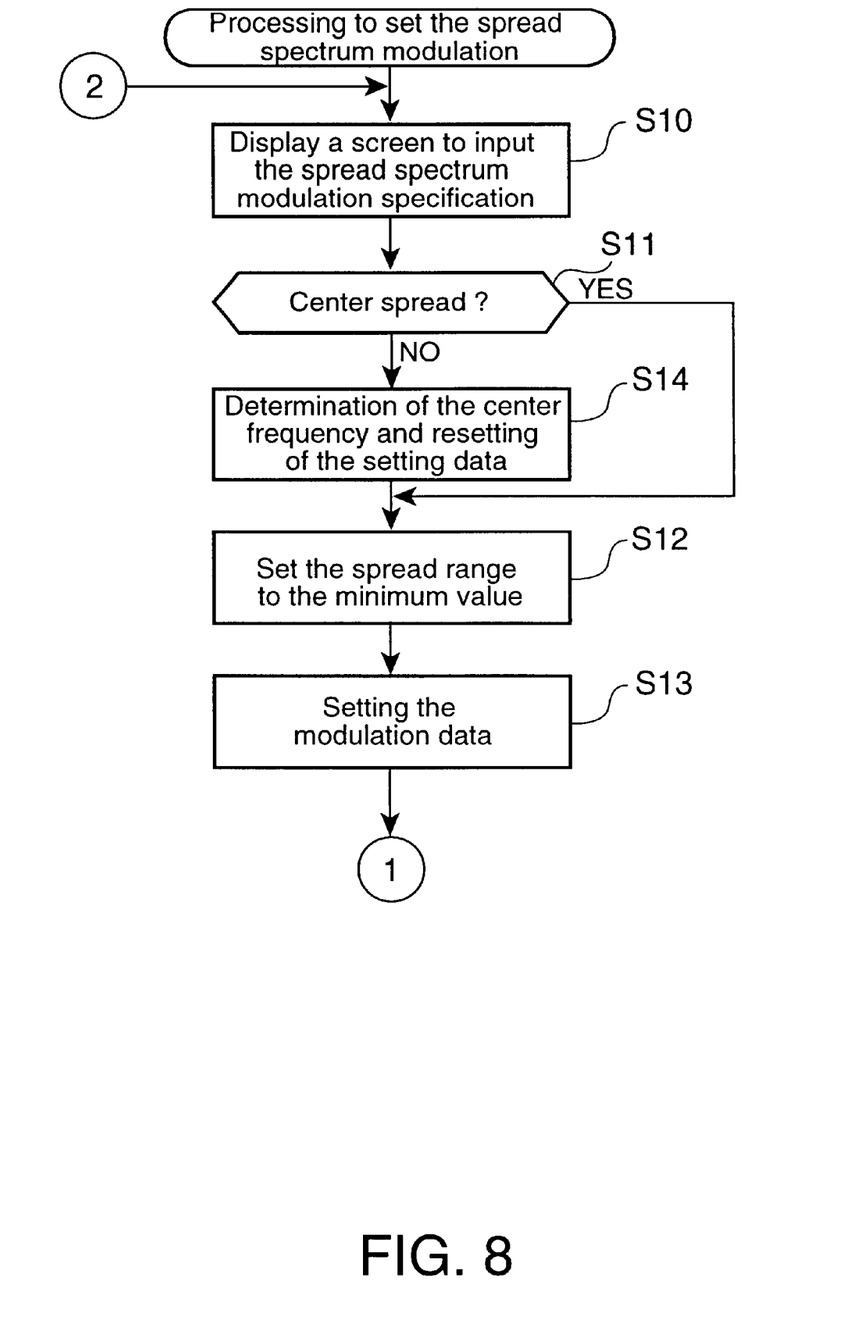
FIG. 8 is a flow chart showing a processing to set the spread spectrum modulation.
Figure 9:
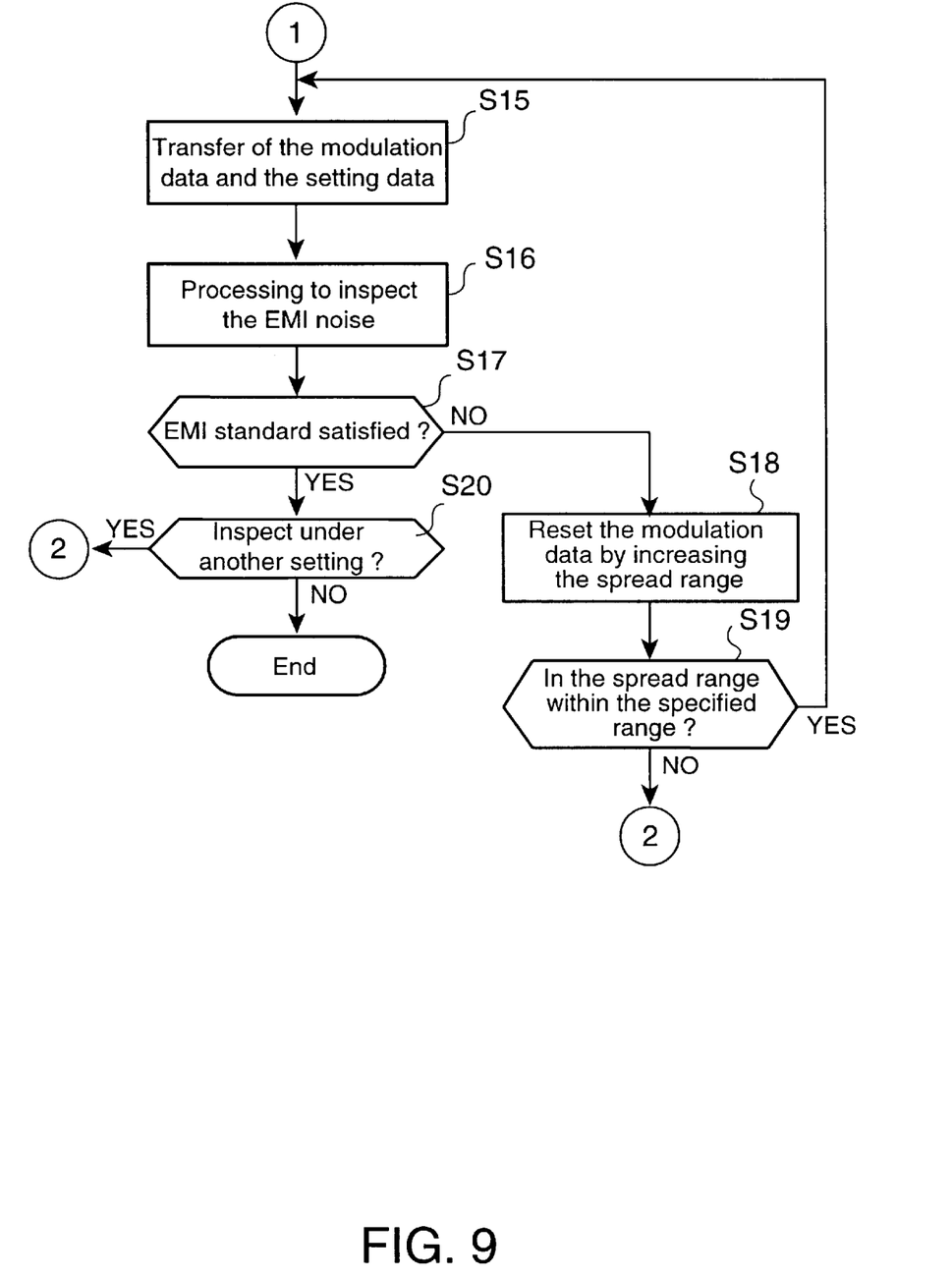
FIG. 9 is a flow chart showing a processing to set the spread spectrum modulation.

The operation of the PC 130 when setting the programmable oscillator 10 is explained hereafter, with reference to the flow charts shown in FIG. 7~FIG. 9. FIG. 7 is a flow chart showing the main routine of the PC 130. First, once a setting instruction of the programmable oscillator 10 is input from a user via the input device 131, the control unit 140 starts a setting processing of the specification frequency fs and the output driver by reading and executing the application program for setting stored in the HDD 150 (Step S1). Namely, the control unit 140 displays on the display 132 an input screen prompting inputs of the specification frequency (setting information) fs and the output driver specification (setting information), and once the specification frequency fs and the output driver specification are input by the user, it sets the corresponding setting data D1~D4 by the parameter setting unit 141.

Next, the control unit 140 performs setting and processing of the EMI standard value (Step S2). Namely, the control unit 140 displays on the display 132 a screen prompting input of a search key of the EMI standard value and searches the EMI standard value information stored in the HDD 150 based on the search key input by the user, through which it searches for the corresponding EMI standard value and sets it as the reference value for judging the EMI noise. Then, the control unit 140 acquires only the setting data D1~D4 set by the parameter setting unit 141, through the data acquisition/writing unit 145, and transfers them to the programmable oscillator 10 via the connection unit 110. As a result, the setting data D1~D4 are designed to be stored in the corresponding areas of the data conversion control circuit 32 of the programmable oscillator 10.

At this time, the control unit 140, by transmitting a switching instruction to the programmable oscillator 10 via the connection unit 110, accomplishes a setting to transmit to the oscillation circuit 20, the variable dividing circuit 40, the PLL circuit 50, and the buffer 70, the data stored in the data conversion control circuit 32 in place of the data stored in the memory 80 by the data selection circuit 31 of the controller 30, and afterwards performs test processing of the EMI noise (Step S3).

In the test processing of the EMI noise, the control unit 140 inputs from the connection unit 110 the measurement results of the oscillation frequency (frequency of the clock signal CL3) and the measurement results of the driving current of the programmable oscillator 10, and displays the values of the oscillation frequency and the consumed power of the programmable oscillator 10 on the display 132 to notify the user. Also, the control unit 140 displays a screen where the measured noise value by the EMI measurement device 160 is input, on the display 132. Then, when the noise radiated from the electronic equipment 120 is measured using the EMI measurement device 160 and the measured noise value is input by the user, the control unit 140 determines whether the input value is below the preset EMI standard value or not (Step S4).

If the control unit 140 determines that the measured noise value is below the EMI standard value (Step S4: YES), after notifying the user that the electronic equipment 120 satisfies the EMI standard by displaying it on the display 132, processing is transferred to the step S6 and the inspection verification process is performed (Step S6). In this case, first the control unit 140, by sending a writing instruction to the programmable oscillator 10 via the connection unit 110, has the writing control circuit 33 write to the memory 80 the setting data D1~D4 stored in the data conversion control circuit 32. Also, the control unit 140, by sending a switching instruction to the data selection circuit 31 of the programmable oscillator 10 via the connection unit 110, performs a setting so that the data (setting data D1~D4) stored by the controller 30 to the memory 80 are transmitted to the oscillation circuit 20, the variable dividing circuit 40, etc.

Once the above setting is complete, the control unit 140 drives the programmable oscillator 10 by the connection unit 110, and displays the oscillation frequency of the programmable oscillator 10 input from the connection unit 110 on the display 132. Thus, the user can verify from the data written in the memory 80 whether the programmable oscillator 10 obtains the specified performance and whether the data are written to the memory 80 normally.

On the other hand, if the control unit 140 determines that the measured noise value is above the EMI standard value (Step S4: NO), it displays on the display 132 that the EMI standard is not satisfied to notify the user and initiates a setting process of the spread spectrum modulation (Step S5). Below, referring to the flow charts shown in FIG. 8 and FIG. 9, actions of the PC 130 when performing the setting process of the spread spectrum modulation are explained.

First, in the PC 130, the control unit 140 displays on the display 132 a screen where the user selects a specification of the spread spectrum modulation (spread profile and spread direction (setting information)) to be set, and once a spread profile and a spread direction are selected by the user via the input device 131, a determination is made (step S11) as to whether the selected spread direction is the center spread or not.

At this time, if it is determined that the center spread is selected (Step S11: YES), the control unit 140 sets the spread range to the preset minimum value (e.g., ±0.5%) (Step S12), and generates the corresponding modulation data DM based on the spread profile, spread direction, and spread range (Step S13). On the other hand, if it is determined that other than the center spread, namely the down spread or the up spread is selected (Step S11: NO), the control unit 140, after resetting the setting data D1~D3 by the parameter setting unit 141 (Step S14) so that the center frequency fc after spreading the spectrum becomes a frequency downward or a frequency upward relative to the specification frequency fs (see FIGS. 6(b) and (c)) input in the step S1 (see FIG. 7), sets the spread range to the preset minimum value (Step S12), and generates the corresponding modulation data DM (Step S13).

Then, after generating the modulation data DM, the control unit 140 acquires the setting data D1~D4 set by the setting unit 141, by the data acquisition/writing unit, and transfers them together with the modulation data DM to the programmable oscillator 10 via the connection unit 110 (Step S15). As a result, the setting data D1~D4 and the modulation data DM are retained in a parallel data format in the corresponding area of the data conversion control circuit 32 of the programmable oscillator 10 by the connection unit 110 (see FIG. 1).

Next, the control unit 140 performs inspection processing of the EMI noise (Step S16). Because the inspection processing of the EMI noise is the same processing as in step S3, the explanation is omitted. Then, the control unit 140 determines whether the noise value of the electronic equipment 120 measured using the EMI measurement device 160 is below the preset EMI standard value or not (Step S17).

If the measured noise value is determined to be above the EMI standard value (Step S17: No), the control unit 140 resets the spread range set in the step S12 to a value increased by a preset value (e.g., ±0.5%) (Step S18), and if the spread range after resetting is determined to be within the preset range (Step S19: YES), processing is returned to the step S15. Thus, the control unit 140, after generating the modulation data DM so that the spread range reset by the spread range setting unit 143 is reached, transfers the modulation data DM to the programmable oscillator 10 via the connection unit 110, and stores it in the data conversion control circuit 32 of the programmable oscillator 10. Then, the control unit 140 again performs inspection processing of the EMI noise to determine whether the measured noise of the electronic equipment 120 is below the EMI standard value or not (Steps S15~S17).

In this manner, it is designed that while the control unit 140 performs the EMI noise inspection process and determines that the measured noise value of the electronic equipment 120 does not satisfy the preset EMI standard value, a circular processing of the step S17→S18→S19→S15→S16→S17 is repeated, and the spread range of the spread spectrum modulation is increased by a specified amount at a time to perform the EMI noise inspection process. Namely, it is designed so that if the spread range is increased, because the peak energy of the frequency standard of the clock signal CL3 output from the programmable oscillator 10 is reduced, noise of the electronic equipment 120 can be reduced.

On the other hand, in this circular processing, if the control unit 140 determines that the spread range after resetting is above the preset range (Step S19: NO), it displays on the display 132 that the spread range is out of the range (Error display) and notifies the user, then afterwards returns the processing to the step S10. By this means, the control unit 140, if the EMI standard value can not be satisfied by changing the spread range, prompts the user to change the specification of the spread spectrum modulation, and performs again the EMI noise inspection of the electronic equipment 120 with the modified specification.

Then, in the step S17, if the measured noise is determined to be below the EMI standard value, the control unit 140, after displaying on the display 132 to notify the user that the electronic equipment 120 satisfies the EMI standard, displays on the display 132 a screen that prompts a selection as to whether to transfer the processing to the step S20 to perform an inspection under another setting or not. Here, if the control unit 140 detects via the input device 131 that "Inspection under another setting" is selected by the user, it returns the processing to step S10. On the other hand, if it detects that "Do no perform an inspection under another setting" is selected, it ends the setting processing of the spread spectrum modulation, and transfer to the step S6 to perform an inspection processing.

Therefore, the control unit 140, by sending a writing instruction to the programmable oscillator 10 via the connection unit 110, has the setting data D1~D4 and the modulation data DM stored in the data conversion control circuit 32 written to the memory 80, and makes a setting so that the controller 30 transmits the data stored in the memory 80 to the oscillation circuit 20, the variable dividing circuit 40, the PLL circuit 50, and the buffer 70 by sending a switching instruction to the data selection circuit 31 of the programmable oscillator 10 via the connection unit 110. Subsequently, the control unit 140 drives the programmable oscillator 10 by the connection unit 110 and displays the oscillation frequency of the programmable oscillator 10 input from the connection unit 110 on the display 132.

As a result, through the data written to the memory 80, the user can check whether the programmable oscillator 10 has acquired the specified performance and check whether the data are written normally to the memory 80. At this time, if the user re-measures the noise radiated from the electronic equipment 120 using the EMI measurement device 160, whether the measured noise satisfies the EMI standard or not can also be checked. In this instance, it may be arranged so that the control unit 140 of the PC 130 again determines whether the EMI standard value is satisfied based on the input noise measurement value.

By this means, the programmable oscillator 10 related to the embodiment can not only change arbitrarily the specification of the oscillation frequency and the output driver and change arbitrarily the setting of the spread spectrum modulation by rewriting the modulation data DM memorized by the memory 80 but can also arbitrarily set whether the spread spectrum modulation is performed by selecting whether the modulation data DM should be memorized in the memory 80. Therefore, by changing the setting of the programmable oscillator 10, it becomes possible to adjust easily the electronic equipment 120 containing the programmable oscillator 10 to satisfy the EMI standard.

(2) The present invention is not limited to the embodiment but can be applied in various kinds of forms. For example, the following modified embodiments are possible.

(2-1) First Modification Example

In the embodiment, although a case was described where the writing device 100 set the programmable oscillator 10 to the specifications of the specification frequency fs and the output driver specified by the user and setting of the spread spectrum modulation was prompted when the electronic equipment 120 containing this programmable oscillator 10 did not satisfy the EMI standard, these settings may be performed at the same time based on the instruction of the user.

(2-2) Second Modification Example

In the embodiment, although a case was described where the programmable oscillator 10 can arbitrarily change the specifications of the oscillation frequency and the output driver and the setting of the spread spectrum modulation, only the setting of the spread spectrum modulation may be made changeable.

(2-3) Third Modification Example

In the embodiment, although a case was described where the user sets only a spread profile and a spread direction when setting the spread spectrum modulation, it may be arranged so that the user can set the spread range. Also, it may be arranged so that the PC 130 is set to change the spread spectrum specification in a preset priority order and the spread spectrum specification set to the programmable oscillator 10 is automatically changed until the PC 130 satisfies the EMI standard.

Furthermore, although a case was described where the EMI noise radiated from the electronic equipment 120 is measured by a human operating the EMI measurement device 160, it may be arranged so that the PC 130 controls the EMI measurement device 160 and automatically acquires the measurement result. Namely, it may be arranged so that the PC 130 automatically performs the processing to set the spread spectrum modulation.

As stated above, the oscillator of the present invention can arbitrarily change the setting of the spread spectrum modulation and easily reduce the noise of electronic equipment containing this oscillator. The entire disclosure of JP 2001-108967 filed Apr. 6, 2001 is expressly incorporated by reference herein.

What is claimed is:

1. An oscillator with a noise reduction function comprising:
    an oscillation means that outputs a first reference signal;
    a memory means where modulation data for performing spread spectrum modulation are selectively memorized, a write control means that writes modulation data to the memory means, and rewrites and erases modulation data memorized in the memory means according to externally input data;
    a modulation signal output means that generates modulation signals from the modulation data and outputs the modulcation signals; and
    a reference signal output means that outputs one of a second reference signal at a frequency which is a multiple of the frequency of the first reference signal when the modulation signal is not input, and a third reference signal wherein the second reference signal is spread spectrum modulated based on the modulation signal when the modulation signal is input.

2. An oscillator with the noise reduction function described in claim 1 wherein:
    at least setting data for setting the multiplication ratio of the first reference signal are memorized in the memory means; and
    the reference signal output means outputs the second reference signal or third reference signal wherein the first reference signal is multiplied by a multiplying ratio based on the setting data.

3. An oscillator with the noise reduction function described in claim 1 wherein:
    the reference signal output means has a dividing means that divides the second or third reference signal output from the reference signal output means and outputs divided signals;
    a control voltage output means that detects a phase difference between the divided signals and the first reference signal and outputs a control voltage that corresponds to the phase difference;
    a mixing means that outputs the modulation signal output from the modulation signal output means overlapped with the control voltage; and
    a voltage control oscillation means that outputs the second or the third reference signal by the output signal frequency of the oscillator with a noise reduction function controlled by the output voltage of the mixing means.

4. An oscillator with the noise reduction function described in claim 1 wherein;
    the oscillation means has an oscillation circuit that oscillates a piezoelectric resonator; and
    another dividing means that divides the output signal of the oscillation circuit and outputs the divided output signal as the first reference signal;
    wherein the memory means further memorizes the setting data for setting the composite capacity of the oscillation circuit and the dividing ratio of the other dividing means, and the oscillation circuit and the dividing means set the composite capacity and the dividing ratio based on the setting data.

5. A writing device that writes data to the memory means of the oscillator with the noise reduction function described in claim 1 further comprising:
    a connection means that connects each terminal of the oscillator with a noise reduction function;
    an input means that inputs the setting information that is to be set to the oscillator with the noise reduction function;
    a modulation data generation means that, according to the specification of the spread spectrum modulation contained in the setting information, generates the corresponding modulation data;
    a transfer means that transfers the modulation data to the oscillator with a noise reduction function; and
    a control means that instructs writing of the transferred modulation data to the oscillator with a noise reduction function.

6. The writing device described in claim 5 further comprising:
    a setting data generation means that generates the setting data for setting the output signal frequency of the oscillator with a noise reduction function based on the specification frequency contained in the setting information;

wherein the transfer means transfers the setting data to the oscillator with a noise reduction function, and the control means instructs writing of the transferred setting data.

7. The writing device described in claim 6 wherein the setting data is generated so that the central frequency of the output signal of the oscillator includes a noise reduction function after the spread spectrum modulation becomes the specification frequency if the spreading direction of the spread spectrum modulation contained in the setting information is center spread, and generates the setting data so that the maximum frequency of the output signal of the oscillator is generated with a noise reduction function after the spread spectrum modulation becomes close to the specification frequency if the spreading direction of the spread spectrum modulation contained in the setting information is down spread.

8. The writing device described in claim 5 further comprising:

a driving means that drives the oscillator with a noise reduction function;

a consumed power measurement means that measures the consumed power of the oscillator with a noise reduction function; and a frequency measurement means that measures the output signal frequency of the oscillator with a noise reduction function.

9. In the control method of a writing device that writes data to the memory means of the oscillator with the noise reduction function described in claim 1, a control method of a writing device comprising:

an input procedure that inputs the setting information to be set to the oscillator with a noise reduction function;

a modulation data generation procedure that, according to specification of the spread spectrum modulation contained in the setting information, generates the corresponding modulation data;

a transfer procedure that transfers the modulation data to the oscillator with a noise reduction function; and an instruction procedure that instructs writing of the transferred modulation data to the oscillator with a noise reduction function.

10. The control method of the writing device described in claim 9 further comprising:

a setting data generation procedure that generates the setting data for setting the output signal frequency of the oscillator with a noise reduction function, based on the specification frequency contained in the setting information;

the transfer procedure transfers the setting data to the oscillator with a noise reduction function; and the instruction procedure instructs writing of the transferred setting data.

11. The control method of the writing device described in claim 10 wherein:

the setting data generation procedure generates the setting data so that the central frequency of the output signal of the oscillator includes a noise reduction function after the spread spectrum modulation becomes the specification frequency if the spreading direction of the spread spectrum modulation contained in the setting information is center spread, and generates the setting data so that the maximum frequency of the output signal of the oscillator with a noise reduction function after the spread spectrum modulation becomes near the specification frequency if the spreading direction of the spread spectrum modulation contained in the setting information is down spread.

12. In the control method of the writing device that writes data to the memory means of the oscillator with the noise reduction function described in claim 1 a control method of a writing device comprising:

a first input procedure that inputs the setting information containing the specification frequency to be set to the oscillator with a noise reduction function;

a setting data generation procedure that generates the setting data so that the output signal frequency of the oscillator with a noise reduction function becomes the specification frequency;

a first transfer procedure that transfers the setting data to the oscillator with a noise reduction function;

a second input procedure that inputs the specification of the spread spectrum modulation to be set to the oscillator with a noise reduction function if the electronic equipment containing the oscillator with a noise reduction function does not satisfy the predetermined EMI standard;

a modulation data generation procedure that, based on the specification of the spread spectrum modulation, generates the corresponding modulation data;

a second transfer procedure that transfers at least the modulation data to the oscillator with a noise reduction function; and an instruction procedure that instructs writing of the transferred setting data and the modulation data to the oscillator with a noise reduction function if the electronic equipment containing the oscillator with a noise reduction function satisfies the predetermined EMI standard.

* * * * *

UNITED STATES PATENT AND TRADEMARK OFFICE
CERTIFICATE OF CORRECTION

PATENT NO. : 6,650,193 B2  Page 1 of 1
DATED : November 18, 2003
INVENTOR(S) : Takashi Endo and Yoichi Fujii It is certified that error appears in the above-identified patent and that said Letters Patent is hereby corrected as shown below:

<u>Title page</u>,
Item [75], Inventors, residence should be -- Takashi Endo, Minowa-machi (JP) --

<u>Column 4</u>,
Line 17, "(VC" should be -- (VC) --
Line 66, "code a" should be -- code $\alpha$ --

<u>Column 10</u>,
Line 34, delete "no" and substitute -- not -- therefor
Line 36, delete "transfer" and substitute -- transfers -- therefor <u>Column 11</u>,
Line 65, delete "modulcation" and substitute -- modulation -- therefor <u>Column 12</u>,
Line 34, "wherein;" should be -- wherein: --

Signed and Sealed this

Thirteenth Day of April, 2004

JON W. DUDAS
*Acting Director of the United States Patent and Trademark Office*